(12) United States Patent
Clark et al.

(10) Patent No.: US 8,813,360 B2
(45) Date of Patent: Aug. 26, 2014

(54) METHOD FOR BEAM WELDING ON COMPONENTS

(75) Inventors: Daniel Clark, Derby (GB); Claudia Berkenhoff, Wehrheim (DE); Claus T Haubold, Wehrheim (DE)

(73) Assignees: Rolls-Royce PLC, London (GB); Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 427 days.

(21) Appl. No.: 13/267,384

(22) Filed: Oct. 6, 2011

(65) Prior Publication Data

US 2012/0097645 A1   Apr. 26, 2012

(30) Foreign Application Priority Data

Oct. 23, 2010   (GB) .................................. 1017958.8

(51) Int. Cl.
| | | |
|---|---|---|
| *B23P 6/00* | (2006.01) | |
| *B23K 15/00* | (2006.01) | |
| *B23K 26/322* | (2014.01) | |
| *B23K 26/32* | (2014.01) | |
| *B23K 26/34* | (2014.01) | |
| *B23K 26/03* | (2006.01) | |
| *B23K 26/067* | (2006.01) | |

(52) U.S. Cl.
CPC ......... *B23K 15/0006* (2013.01); *B23K 15/0086* (2013.01); *B23K 26/3213* (2013.01); *B23P 6/00* (2013.01); *B23K 15/00* (2013.01); *B23K 26/345* (2013.01); *B23K 26/322* (2013.01); *B23K 15/0046* (2013.01); *B23K 15/0093* (2013.01); *B23K 26/034* (2013.01); *B23K 26/0673* (2013.01); *B23K 2201/001* (2013.01)
USPC .......... 29/889.1; 148/524; 148/525; 148/565; 148/669; 219/121.14; 219/121.64

(58) Field of Classification Search
CPC ............. B23K 26/067; B23K 26/0673; B23K 26/0676; B23K 26/20; B23K 15/00; B23K 15/0046; B23K 15/0086; B23K 15/0093; B23K 26/3213; B23K 26/322; B23K 26/345; B23P 6/00

USPC ............. 219/121.63, 121.64, 121.76, 121.77, 219/121.14; 29/889.1, 889.2, 889.7, 29/888.021; 148/516, 524, 525, 565, 669
See application file for complete search history.

(56) References Cited

U.S. PATENT DOCUMENTS 3,497,947 A * 3/1970 Ardezzone ...................... 29/840
6,191,379 B1   2/2001 Offer et al.
(Continued)

FOREIGN PATENT DOCUMENTS

| EP | 1 473 106 A1 | 11/2004 |
|---|---|---|
| EP | 1 640 105 A1 | 3/2006 |

(Continued)

OTHER PUBLICATIONS

Feb. 9, 2012 Search Report issued in European Patent Application No. 11 18 4089.

(Continued)

*Primary Examiner* — Samuel M Heinrich
(74) *Attorney, Agent, or Firm* — Oliff PLC

(57) ABSTRACT

In a method for beam welding on components with a laser beam or electron beam generated by a beam source, the heat treatment of the welded component required to remove stresses is integrated into the welding process. In a work cycle combined with the welding process, a regulated heat supply to a selected region takes place, according to its residual heat resulting from the welding process and the predicted stresses in that region, using the residual heat remaining from the welding process following the welding process from the same or other beam source(s). The welding region is cooled in a controlled manner, so that welded components which are likely to be subject to high stress in use, provided for example for a aircraft engine, can be made available without inherent stresses and with the desired microstructure in a single—combined—work step.

13 Claims, 2 Drawing Sheets

(56) References Cited

U.S. PATENT DOCUMENTS

| | | |
|---|---|---|
| 2005/0028897 A1 | 2/2005 | Kurz et al. |
| 2005/0194363 A1 | 9/2005 | Hu et al. |
| 2006/0081571 A1* | 4/2006 | Hoebel et al. ............ 219/121.64 |
| 2008/0203139 A1* | 8/2008 | McCrink et al. ............ 228/158 |
| 2010/0086003 A1* | 4/2010 | Pfitzner et al. .................... 374/5 |

FOREIGN PATENT DOCUMENTS

| | | |
|---|---|---|
| EP | 1 747 836 A1 | 1/2007 |
| EP | 2 119 799 A1 | 11/2009 |
| JP | A-54-153745 | 12/1979 |
| JP | 59080728 A * | 5/1984 |
| JP | A-61-221330 | 10/1986 |
| JP | A-63-165084 | 7/1988 |
| JP | A-1-186293 | 7/1989 |
| JP | A-6-126477 | 5/1994 |
| JP | A-2005-232586 | 9/2005 |
| JP | A-2006-15399 | 1/2006 |

OTHER PUBLICATIONS

British Search Report issued in Application No. 1017958.8; Dated Nov. 22, 2010.

* cited by examiner

METHOD FOR BEAM WELDING ON COMPONENTS

The invention relates to a method for beam welding on components.

It is known that conventional beam welding methods such as laser beam welding, for example laser beam deposition welding used for the repair of highly stressed expensive aircraft engine parts such as blisks or suchlike, cause a number of problems. Microstructural changes as well as stress peaks and inherent stresses caused by thermal shrinkage can occur in the welding region and in areas adjacent the welding region in connection with the high localised solidification and cooling rates, which can in turn lead to distorted components, or components having reduced strength. This distortion can be particularly pronounced in laser deposition welding, where the weld may have different metallurgical properties compared to the non-welded region of the component. The distortion can lead to a component having a profile which differs markedly from a required final profile.

The microstructural changes and induced stresses have to be reduced by a separate, and subsequent, heat treatment of the whole component or the welding region concerned. This mode of procedure is time-consuming and associated with a high outlay on equipment, since the additional work step has to be carried out in a separate device and in a protective gas atmosphere. A further costly processing step for post-treatment of the surface of the heat-treated component, for example by shot-peening, may also be necessary. The production or repair of highly stressed components, for example aircraft engine components, by means of beam welding (laser-beam or electron-beam welding) is therefore associated with high time consumption and cost.

Post weld heat treatment of the whole or large areas of the component however can exacerbate thermal expansion of the component, thereby producing thermal stress peaks.

The problem underlying the invention, therefore, is to provide a method for beam welding, with which highly stressed and high-value components can be manufactured or repaired with reduced time consumption and expenditure, and to reduce the total heat delivered to the component during the post weld heat treatment step.

The present invention is defined in the attached independent claim to which reference should now be made. Further, preferred features may be found in the sub-claims appended thereto.

According to the present invention there is provided a method for welding a component with a laser beam or electron beam generated by a beam source, the method comprising the steps of:
  welding the component using the beam source;
  selecting at least one region of the component for heat treatment, the selected region having a predicted residual stress following the welding step above a predetermined limit; and
  delivering a supply of heat to the at least one selected region to thereby control a cooling rate of the selected region.

By delivering a supply of heat to a selected region having a predicted residual stress following the welding step above a predetermined limit, the heat treatment step is performed only in a required area or areas, thereby reducing the heat added to the component during the heat treatment step, while avoiding shrinkage stresses and forming a desired microstructure in an integrated process.

The supply of heat may be delivered to the heat treatment region from the same or other beam sources(s) as the welding beam source. Alternatively or in addition, the heat may be delivered to the heat treatment region from an inductor coil, or from a heated gas jet for example.

The selected region may comprise the welded region, and/or may comprise a region of the component adjacent the welded region, which has been heated by the welding beam to a lesser extent than the welded region. The selected region may be located at or adjacent a junction between the welded region and a non-welded region of the component. The selected region may be a region of the component predicted to have a tensile residual stress above a predetermined limit. The "residual stress" is the stress remaining in a region of the component once the component is fully cooled following the welding step. By "predicted stress", it is meant the residual stress in the absence of a heat treatment step. The predetermined limit of the predicted residual stress following the welding step may be 100 MPa.

Residual heat remaining in the welded region from the welding process may be determined by a thermal model or directly measured, and the location of the selected region and/or heat supply to the selected region during the heat treatment may be selected in dependence on of the residual heat. The heat supply to the heat treatment region, and/or the quantity of residual heat may controlled by modulating the beam source. The beam source may be modulated by one or more of adjusting the focus of the beam source and adjusting the intensity of the beam source.

The thermal model may be determined in dependence on any of surface temperature of the component, residual heat of the welded region, measured or calculated emissivity of the heat treatment region, substrate geometry, deposit geometry, layer characteristics, process parameters, thermal gradients and deposition toolpath.

The residual heat remaining after the welding process may be detected using a pyrometer or other thermal imaging device. That is to say, the residual heat remaining in the component, or at a point on the component, or in a region of the component, may be detected once the point or region has undergone welding. The welding process may still be ongoing at other points and regions of the component, and may be repeated over the measurement region. The thermal imaging device may be rastered across a surface of the component to detect heat from multiple locations, thereby providing data which may generate a dynamic temperature distribution. Both sides of the component may be monitored.

A dynamic temperature distribution may be determined in the pyrometric heat measurement using a plurality of thermal imaging devices, for example pyrometers. Using a plurality of such enables measurements to be taken at different locations simultaneously on the component before, during and after the welding process. Thus the method enables regulation of the heat supply for controlled cooling and optimum material properties resulting therefrom.

The heat may be delivered for the heat treatment after the heat has been delivered for the welding process, a cooling phase lying between the welding process and the heat treatment. That is to say, the heat treatment process may not occur directly with or after the welding process, but after an—albeit only short—cooling phase.

Controlled cooling may be provided by the supply of a cooling medium before and/or after the heat treatment in order to be able to influence the cooling process in a more selective manner.

Controlled cooling may be provided by the provision of an insulating member around the component being welded. The insulating member will act to reduce radiative heat losses, maintaining heat in the component for longer. The insulating member may be disposed around the component, or part of the component, at selected stages of the welding process to control of the amount and rate of heat losses as required. The insulating member may be spaced apart from the component. The insulating member may comprise a scarf of ceramic material.

One beam source may deliver a beam for the welding process and for the heat treatment process; the beam being split by a beam splitter to deliver portions of the beam to the welded region and the heat treatment region.

The heat supply for the heat treatment may be provided by at least one separate beam source.

The beam source may provide a beam which is split by a beam splitter to deliver heat to both sides of the welded region for the heat treatment process.

The heat supply may take place on both sides and in the opposite direction to the welded region, and more precisely either with the aid of a split laser beam or two separate laser beams generated by laser beam sources disposed separately.

The invention thereby provides a process in which the heat treatment of a component welded by means of laser beams or electron beams is integrated into the welding process. In a work cycle combined with the welding process, a heat supply to heat treatment region subsequent to the welding step takes place using the residual heat remaining from the welding process following the welding process from the same or other beam source(s). The welding region is cooled in a controlled manner, so that components which may be subject to high stress in use, provided for example for a aircraft engine, can be made available with substantially reduced inherent stresses than would otherwise be generated and with the desired microstructure in a single—combined—work step. On the one hand, the method is cost-effective because the labour input is small due to the combined processing in one and the same device. On the other hand, the outlay on equipment is reduced, since a separate expensive heat treatment device, in which the component is either completely or locally heat-treated, is not required or required for a much shorter subsequent cycle depending on the alloy. Moreover, a post-treatment of the component, for example by shot-peening, which may be necessitated by the separate heat treatment of the component, is potentially dispensed with depending on component application.

The heat treatment step is adapted precisely to the preceding welding process. The residual heat remaining in the heat treatment region is measured and the heat supply to the welded region is regulated by controlling the position, movement and timing of the power level of the input energy distribution from the beam source on the basis of the amount of residual heat, the locations of the regions of high predicted stress and the generated temperature profile. A formation of the component which is optimum with respect to the inherent stresses and the microstructure is thus guaranteed.

Embodiments of the invention will now be described with reference to the accompanying drawings, in which.

The invention relates to laser beam deposition welding in the repair of highly stressed aircraft engine components, wherein one or more heat treatment regions of the component undergoes a heat treatment after the welding process in order to reduce welding stresses caused by differential cooling of the component.

Figure 1:
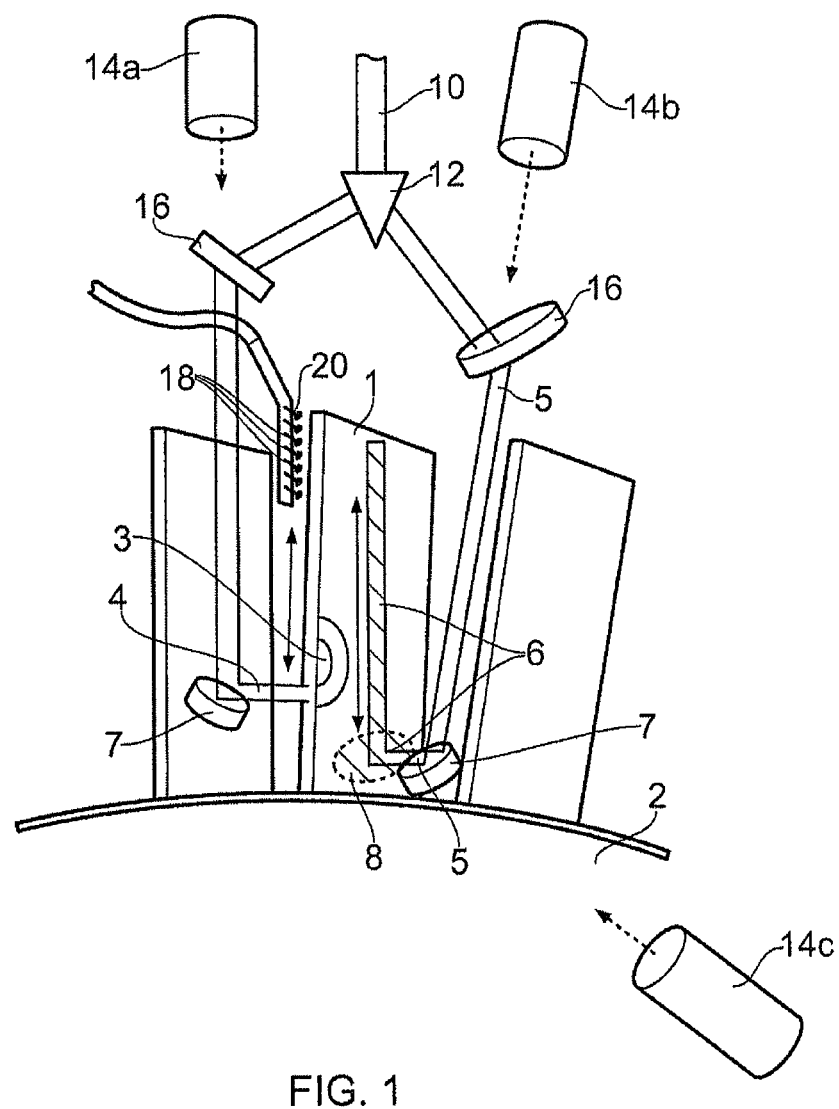
FIG. 1 shows one example of how the method of the present invention may be carried out.

FIG. 1 shows an array of aerofoils 1 which comprise part of a blisk 2. A damaged region on the blade 1 is identified and then removed. The cut out region is then melted locally with a laser deposition beam 4 originating from a laser source 10 and orientated and steered by laser optics 7, 16 onto a welding region 3 of the blade 1 and, at the same time, a consumable, such as a metal powder or wire (not shown) is fed to the weld region 3 and melted, the material of said consumable being mixed with the molten metal of the blade 1. Hence the damaged region of an aerofoil 1 is built up with laser deposited material in the welded region 3. In the example shown, laser beam steering mirrors 7 and lenses 16 are employed to direct the beams 4,5 onto the aerofoil 1, although any appropriate means of beam delivery could be employed. During welding, other parts of the component may also be heated by conductive heat transfer from the welded region.

The weld region 3 and possibly adjacent regions of the component then cools. Cooling may be forced by the application of a cooling medium 18, for example a protective gas. In FIG. 1 the cooling medium is shown being delivered via a nozzle 20, although any appropriate means of delivery may be employed.

The cooling is controlled, however, in that a heat treatment region 6 is heated by means of a second laser beam 5 after the material deposition. In FIG. 1, the path of the laser heating beam 5 and the laser-heat treatment area is denoted by reference numeral 6. In this embodiment, the axis of the deposition beam 4 is approximately 90 degrees to the laser heating beam 5. In embodiments where the component geometry and access to the component surfaces differs, the relative orientation of the axes of the deposition beam 4 and laser heating beam 5 may be different.

By applying heat to the heat treatment region (6), cooling is controlled such that different regions of the component cool at similar rates, thus preventing regions of high stress, and particularly tensile stress, from developing in the component.

The laser heating beam 5 is not directed onto the blade 1 immediately at the start of the material deposition and not necessarily in the position of the material deposition, but after the lapse of a time interval starting with the deposition of the weld filler on the base material and with the start of the cooling cycle. The renewed heat input for the controlled cooling takes place at a time when the component, in this case the blisk blade, is still hot from the preceding laser deposition welding, i.e. before the component has completely cooled down and local stress peaks can be generated due to the laser deposition welding and complete cooling.

In the case of titanium 64, for example, the cooling rate from the melting temperature to the solidification temperature is maximised, the rate through the solid-state phase transition is similarly controlled to be sufficiently rapid, and heat is introduced thereafter which may involve a slight local temperature rise, in order to regulate the cooling from, for example, 800 to 200° C. The deposition welding process is repeated in combination with the controlled cooling until such time as the blisk blade has reached its original size and can subsequently be processed mechanically.

Figure 2:
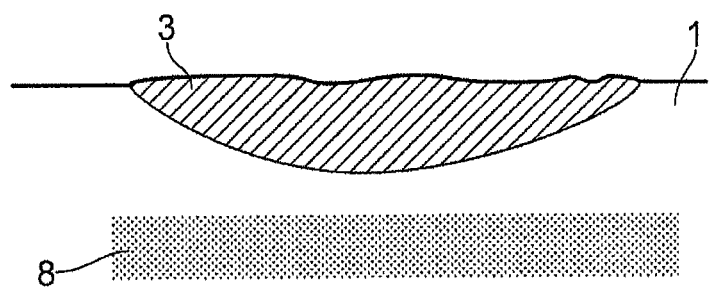
FIG. 2 shows an enlarged view of a welded region and a heat treatment region generated by the method of the present invention.

FIG. 2 shows the laser deposited area 3 (weld) and the laser-heat treatment region 8. The laser heat treatment region 8 may also overlap or encompass the laser deposited area 3. In particular, the laser heat treatment region 8 is selected according to areas of predicted high residual stress within the component, i.e. regions that would have high residual stress were the heat treatment step not carried out. Such areas would otherwise be created by differential cooling rates of the heat treatment region and the remainder of the component. The heat treatment region 8 could be selected on the basis of direct heat measurements, or on the basis of a thermal model.

In order to regulate the heat input for the controlled cooling after the laser deposition welding, a heat measurement takes place during the heat treatment. This is preferably a contactless measurement taken with the aid of a thermal imaging device 14.

One or more thermal imaging devices 14, for example thermal cameras or pyrometers, scan across the heated regions to gather data during the welding process. One of the thermal imaging devices 14a shown in FIG. 1 is directed towards and scans laser deposition area 3. A second thermal imaging device 14b continually monitors the laser heat treated area 8 actively being heated by the laser heating beam 5. The first thermal imaging device 14a and second thermal imaging device 14b share the beam path and optics 7,16 with the deposition beam 4 and heat treatment beam 5 respectively. A third thermal imaging device 14c is directly aimed at the laser heat treated area 8. The thermal imaging devices 14 are designed to be resistant to back-reflection from the laser, at simplest by switching the laser off or using one way optics 16. The thermal imaging devices 14 would operate over two wavelengths to reduce measurement error due to variations in emissivity.

The system is used in conjunction with a thermal model to regulate heat input requirements, ideally via a feedback loop. The thermal model would be tested for acceptability of possible output thermal histories with a thermo-mechanical model and actual physical mechanical property testing. The thermal model may be dependent on any of substrate geometry, deposit geometry, layer characteristics, process parameters, thermal gradients and deposition toolpath. In other words, the temperature measurements in conjunction with the thermal model may be used to determine the location of the heat treatment region by predicting the regions of high stress that would otherwise occur if the heat treatment were not carried out.

Use of a plurality of thermal imaging devices enable a dynamic temperature distribution during the heat input with the heat treatment laser. The distribution of temperature will change during the welding cycle. Thermal gradients follow the movement of the (deposition) heat source. Over time the gradients will change due to the heating of the substrate by conduction from the process area and due to the relative position and movement history of the heat source. Pyrometers are calibrated according to the degree of emission of the layer deposited on the blisk blade. Pyrometers may be employed to detect heat emitted from parent material of the component, as opposed to a welded surface. Doing so will ensure more accurate readings as the pyrometer can be calibrated on a known surface finish (i.e. a substrate surface of the parent component).

As shown in FIG. 1, one and the same laser source 10 was used for the laser beam deposition welding and for the subsequent controlled cooling, the laser beam being split with the aid of a beam splitter 12. Optics 16, which may be mirrors or lenses, direct the split beam to their respective target areas.

Figure 3:
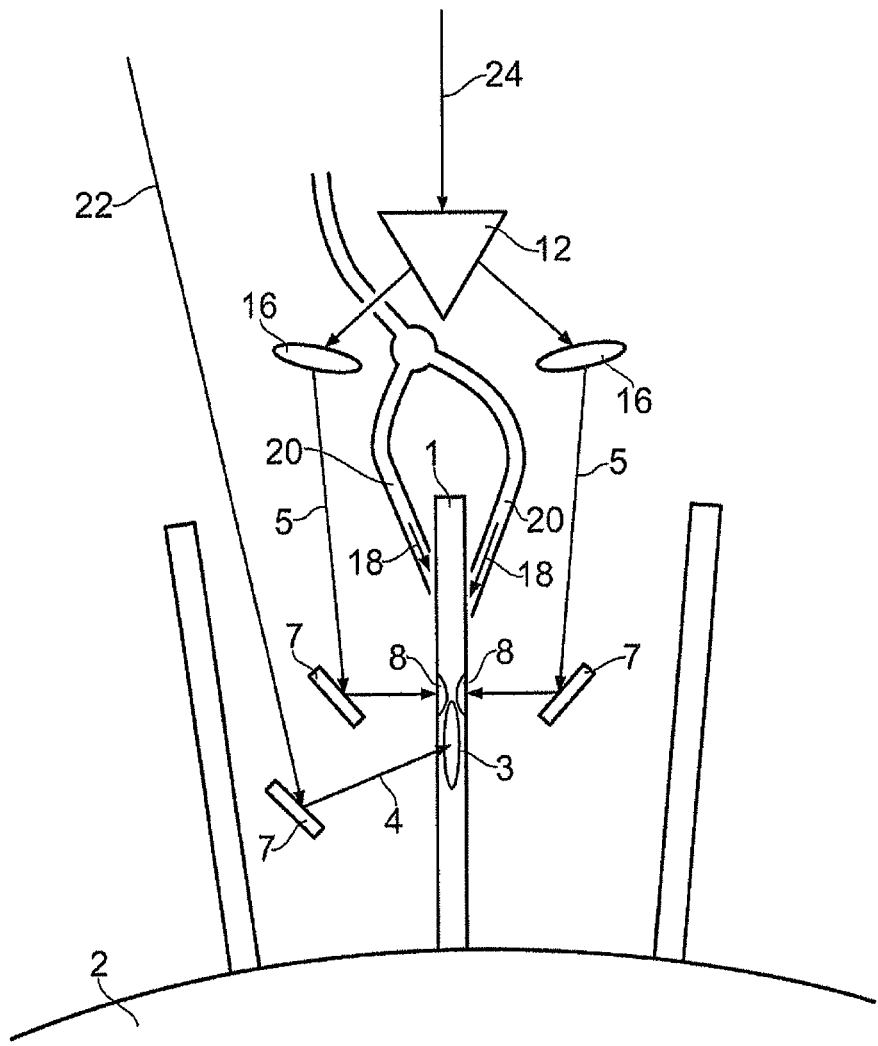
FIG. 3 shows a further example of how the method of the present invention may be carried out.

Use can however also be made of two or more a laser sources such that, after the welding process carried out with a first laser, a two-sided, oppositely directed heat influence on the welding region 3 can be exerted with a second laser with a split laser beam or second and third lasers disposed opposite one another. Such an arrangement is shown in FIG. 3. For clarity, features common to the embodiment of FIG. 1 are referred to with the same reference numerals. In this embodiment the laser deposition beam 4 is provided from a beam source 22 and the heat supply for the heat treatment is provided by a separate beam source 24. The beam source 24 is split by a beam splitter 12 to deliver two heat treatment beams 5 to heat treatment areas 8 on both sides of the welded region 3. The laser deposition beam 4 is directed to an edge of the aerofoil 1, whereas the heat treatment beam 5 is directed to either side of the aerofoil 1, and hence to either side of the welded region 3.

A Nd:YAG laser or a $CO_2$ laser or a fibre or disc laser or diode laser may be used to generate the laser beams. The laser would typically have a constant focal length and is moved during the laser beam generation on a pre-programmed path, here along the side face of the blisk blade to be deposited onto. Since the laser beam deposition welding and the subsequent heat treatment for the controlled cooling are carried out in one work cycle, the laser optics of the laser are protected with the aid of protection plates against weld metal particles scattered during the welding process.

Through the use of the residual welding heat, the heat treatment process is integrated into the welding process and ensures, by means of a heat supply to the heat treatment region regulated on the basis of the residual heat and a corresponding control of the laser, a controlled cooling, as a result of which the occurrence of shrinkage stresses is prevented and an optimum weld joint is formed. Thus the amount and rate of heat delivery is actively controlled.

The heat treatment region may also be determined based on a knowledge of the temperature distribution within the component, for example from data gathered from thermal imaging devices. Analysis of the temperature distribution may indicate that heat or cooling should be supplied to one region in preference to another to achieve a desired cooling rate and to prevent stress from accumulating in that region. The method further comprises the step of providing heat or cooling preferentially to regions of the component in dependence upon the temperature distribution. Hence the region or location to which heat is delivered may also be actively controlled.

For multiple layer welding processes (for example, where more than one layer of welded material is deposited) the heat treatment process may be started after a plurality of layers of welded material have been deposited. This thereby prevents heat build up in the component.

The beam 10 and the pyrometers/thermal imaging devices 14 may be delivered to side faces via reflective optics 16 to allow access between aerofoils.

The optics may be movable and operable to direct the beams to different locations on the blade 1.

A flow of inert gas could be applied to shield the optics from stray particles and to help cool the optics.

While the invention has been described in conjunction with the exemplary embodiment described above, many equivalent modifications and variations will be apparent to those skilled in the art when given this disclosure. Accordingly, the exemplary embodiments of the invention set forth above are considered to be illustrative and not limiting. Various changes to the described embodiment may be made without departing from the spirit and scope of the invention.

For example, though the above embodiment described the heat delivered to the heat treatment region as being from the same or a further beam source, the heat could be delivered from, an inductor coil or a heated gas jet for example.

The invention claimed is:

1. A method for welding a component, the method comprising the steps of:
   performing a welding step including welding the component using a beam source including at least one of a laser beam source and an electron beam source;
   predicting a residual stress in one or more regions of the component;
   selecting at least one region of the component for heat treatment, the selected region having a predicted residual stress greater than a predetermined limit following the welding step; and
   delivering a supply of heat to the at least one selected region to control a cooling rate of the at least one selected region, wherein
   a residual heat remaining in the welded region following the welding step is determined by a thermal model or directly measured, and at least one of: (1) a location of the at least one selected region, and (2) a heat supply to the at least one selected region during the heat treatment, is selected based upon the determined quantity of residual heat in the welded region.

2. The method according to claim 1, in which the heat supply to the selected region is controlled by modulating the beam source.

3. The method according to claim 2, in which the beam source is modulated by one or more of adjusting the focus of the beam source, and adjusting the intensity of the beam source.

4. The method according to claim 1, wherein the residual heat remaining after the welding process is detected using a pyrometer.

5. The method according to claim 1, wherein a dynamic temperature distribution is determined in the pyrometric heat measurement using a plurality of pyrometers.

6. The method according to claim 1, wherein the thermal model is determined in dependence on any of surface temperature of the component, residual heat of the welded region, measured or calculated emissivity of the heat treatment region, substrate geometry, deposit geometry, layer characteristics, process parameters, thermal gradients and deposition toolpath.

7. The method according to claim 1, wherein the heat is delivered for the heat treatment after the heat has been delivered for the welding process, a cooling phase lying between the welding process and the heat treatment.

8. The method according to claim 1, wherein controlled cooling is provided by the supply of a cooling medium before and/or after the heat treatment.

9. The method according to claim 1, wherein one beam source delivers a beam to the region to be welded for the welding process and to the selected region for the heat treatment process; the beam being split by a beam splitter to deliver portions of the beam to the region to be welded and the selected region.

10. The method according to claim 1 wherein the heat supply for the heat treatment is provided by at least one separate beam source.

11. The method according to claim 1, wherein the beam source provides a beam which is split by a beam splitter to deliver heat to both sides of the heat treated region for the heat treatment process.

12. The method according to claim 1, in which the predetermined limit is substantially 100 MPa.

13. The method according to claim 1, wherein the thermal model is formulated based on output thermal histories and physical mechanical properties for a material composition of the component.

* * * * *